(12) United States Patent
Huang et al.

(10) Patent No.: US 11,536,609 B2
(45) Date of Patent: Dec. 27, 2022

(54) MULTI-EXCITATION WAVELENGTH SPECTROMETER FLUORESCENCE LASER RADAR SYSTEM

(71) Applicant: Lanzhou University, Lanzhou (CN)

(72) Inventors: Zhongwei Huang, Lanzhou (CN); Jianping Huang, Lanzhou (CN); Wuren Li, Lanzhou (CN); Ze Li, Lanzhou (CN); Jianrong Bi, Lanzhou (CN); Jinsen Shi, Lanzhou (CN)

(73) Assignee: LANZHOU UNIVERSITY, Lanzhou (CN)

( * ) Notice: Subject to any disclaimer, the term of this patent is extended or adjusted under 35 U.S.C. 154(b) by 0 days.

(21) Appl. No.: 17/141,624

(22) Filed: Jan. 5, 2021

(65) Prior Publication Data

US 2022/0163392 A1    May 26, 2022

(30) Foreign Application Priority Data

Nov. 26, 2020 (CN) .......................... 202011350982.9

(51) Int. Cl.
G01J 3/44 (2006.01)
G01J 3/02 (2006.01)
G01S 17/00 (2020.01)
G01S 7/481 (2006.01)

(52) U.S. Cl.
CPC ............. *G01J 3/4406* (2013.01); *G01J 3/021* (2013.01); *G01J 3/0294* (2013.01); *G01S 7/481* (2013.01); *G01S 17/003* (2013.01)

(58) Field of Classification Search
CPC ........ G01J 3/4406; G01J 3/021; G01J 3/0294; G01S 7/481; G01S 17/003
See application file for complete search history.

(56) References Cited

U.S. PATENT DOCUMENTS

2002/0063220 A1* 5/2002 Engelhardt ............ G02B 21/16
250/458.1

FOREIGN PATENT DOCUMENTS

| CN | 104122562 A | * 10/2014 | ............. G01N 21/21 |
| CN | 104122562 A | 10/2014 | |
| CN | 107831155 A | 3/2018 | |

\* cited by examiner

*Primary Examiner* — Jamil Ahmed
(74) *Attorney, Agent, or Firm* — WPAT, PC

(57) ABSTRACT

The present invention discloses a multi-excitation wavelength spectrometer fluorescence laser radar system, including a multi-wavelength laser emission system, a signal frequency division system and a data storage and display system. The present invention emits lasers with a plurality of wavelengths into the atmosphere simultaneously to alternately excite an organic matter in atmospheric particulate matters and obtain a fluorescence spectrum. The lasers with different wavelengths can excite the same organic matter to obtain different spectra. By analyzing a matrix diagram of each excitation and emission fluorescence spectrum, the present invention effectively explores the features of compositions and concentration of the organic matter in the atmospheric particulate matters.

9 Claims, 1 Drawing Sheet

MULTI-EXCITATION WAVELENGTH SPECTROMETER FLUORESCENCE LASER RADAR SYSTEM

TECHNICAL FIELD

The present invention relates to the technical field of atmospheric monitoring, in particular to a multi-excitation wavelength spectrometer fluorescence laser radar system.

TECHNICAL BACKGROUND

A laser radar, as an instrument that can continuously detect the atmosphere in real time, has been widely used to detect the distribution of vertical features of aerosols, hazes, sands and dusts, and the like and has become one of the important instruments for studying the atmosphere. A fluorescence laser radar, as a new type of laser radar, is developed relatively late. In recent years, some companies and research institutions have built a fluorescent laser radar system to detect individual fluorescent light waves. However, most fluorescent laser radars only use excitation of a single-wavelength laser to obtain a fluorescence spectrum of a certain or individual wavelength band. There are almost no instruments on the market that use lasers with a plurality of wavelengths to simultaneously excite all or part of the fluorescence spectrum of a certain or individual wavelength band.

Three-dimensional fluorescence spectroscopy technology can quickly and accurately analyze and identify the compositions, source, structure and other characteristics of an organic matter in atmospheric particulate matters. The three-dimensional fluorescence spectroscopy technology, like other instruments and methods above, all need to first sample the organic matter in atmospheric particulate matters at fixed points and time. The organic matter in atmospheric particulate matters needs to be first further processed in a laboratory after being sampled and then is analyzed and identified using the above-mentioned instruments or methods, which cannot realize real-time analysis and identification of data. Further, the frequency, time, and quality of sampling vary from person to person, and are extremely seriously subject to subjective and objective factors. In addition, atmospheric particulate matters continue to circulate, and the air environment is constantly changing under the influence of pressure, temperature, humidity, and the like, and the results of analysis and identification are seriously lagging behind the actual situation. The reliability of the data needs to be investigated. There is still a lack of effective support for the early warning of atmospheric prevention and control if the three-dimensional fluorescence spectroscopy technology is applied in fields of meteorological and environmental protection. Therefore, the present invention proposes a multi-excitation wavelength spectrometer fluorescence laser radar system to solve the problems in the prior art.

SUMMARY OF THE INVENTION

In view of the above-mentioned problems, the object of the present invention is to provide a multi-excitation wavelength spectrometer fluorescence laser radar system that uses lasers with a plurality of wavelengths to be emitted into the atmosphere at the same time to alternately excite an organic matter in atmospheric particulate matters and obtain fluorescence spectrum. The spectra obtained by laser excitation of lasers with different wavelengths on the same organic matter are not the same. By analyzing a matrix diagram of each excitation and emission fluorescence spectrum, the multi-excitation wavelength spectrometer fluorescence laser radar system is used to effectively explore the characteristics of the composition and concentration of the organic matter in atmospheric particulate matters. The present invention can realize continuous observation, does not need manual sampling, improves data reliability, accuracy and instantaneity, provide a basis for meteorological and environmental protection departments to grasp changes of the organic matter in the atmospheric particulate matters in time, so as to conveniently find abnormal changes in time and take effective measures to deal with the abnormal changes. Simultaneous detection of a plurality of instruments can grasp circulation of the organic matter of the atmospheric particulate matters to provide the possibility of early warning.

In order to achieve the purpose of the present invention, the present invention is achieved through the following technical solutions: a multi-excitation wavelength spectrometer fluorescence laser radar system comprises a multi-wavelength laser emission system, a signal frequency division system, and a data storage and display system. The multi-wavelength laser emission system consists of a multi-wavelength laser assembly, a high-energy beam splitter, a high-energy integrated optical mirror, a first high-energy reflector, a second high-energy reflector, a high-energy mirror and a High-energy-efficiency frequency target assembly. The signal frequency division system consists of a Cassegrain high-power astronomical telescope, a diaphragm, a first convex lens, a second convex lens, a first dichroic mirror, a second dichroic mirror, a trap wave filter, a polarizing crystal, an avalanche diode, a first photoelectric multiplier tube, a second photoelectric multiplier tube, a fluorescent frequency conversion frequency divider 19 and a high-precision synchronous timer. The data storage and display system consists of a fluorescence spectrometer, a high-speed data collector, an industrial computer and a display. The multi-wavelength laser assembly 1 simultaneously generates output of lasers with seven wavelengths of 266 nm, 280 nm, 295 nm, 308 nm, 355 nm, 532 nm, and 1064 nm, and divides the lasers into a first laser and a second laser through the high-energy beam splitter.

A further improvement is that the first laser consists of the lasers with two wavelengths of 532 nm and 1064 nm, is emitted into the atmosphere through the first high-energy reflector, and the high-energy light integrated optical mirror and the high-energy mirror, and generates a mie scattering signal after irradiating dust particles, aerosols, sands and dusts, and clouds in the atmosphere. The second laser consists of the lasers with five wavelengths of 266 nm, 280 nm, 295 nm, 308 nm and 355 nm. After the lasers with five wavelengths pass through the high-energy beam splitter, the high-efficiency frequency target assembly selects the laser with a specific wavelength. Then the laser with the specific wavelength is emitted into the atmosphere after passing through the second high-energy reflector, the high-energy integrated optical mirror and the high-energy mirror. The organic matter irradiated to the atmospheric particulate matters generates the mie scattering signal, and the organic matter is excited to generate a fluorescence spectrum signal.

A further improvement is that all the mie scattering signals and fluorescence spectrum signals generated by the first laser and the second laser irradiated into the atmosphere are received by the Cassegrain high-power astronomical telescope and focus on the diaphragm, and the focused signals are converted into parallel light by passing through the first convex lens, and the parallel light is then transmitted to the first dichroic mirror.

A further improvement is that the first dichroic mirror 12 separates out the laser with the long-wavelength signal of 1064 nm. The laser with the long-wavelength signal of 1064 nm is converted into electrical signals after being received by the avalanche diode. The electrical signals are transmitted to the high-speed data collector 22, and the remaining optical signals are transmitted to the second dichroic mirror 13 through the first dichroic mirror 12.

A further improvement is that the second dichroic mirror separates out the signals with the wavelength of 532 nm. The signals with the wavelength of 532 nm are transmitted to the first photoelectric multiplier tube and the second photoelectric multiplier tube via the polarizing crystal. The first photoelectric multiplier tube and the second photoelectric multiplier tube convert the optical signals into the electrical signals. The electrical signals are transmitted to the high-speed data collector, and the remaining optical signals passes through the second dichroic mirror to be filtered with the signals with the wavelength of 532 nm via the trap wave filter and be then continuous to be transmitted to the fluorescence frequency divider.

A further improvement is that the fluorescence frequency divider is controlled by a high-precision synchronous timer and synchronized with the high-energy-efficiency frequency target assembly, so that the fluorescence spectrum signals corresponding to the high efficiency frequency target assembly 7 are screened out, then focused by the second convex lens and projected on the fluorescence spectrometer.

A further improvement is that the signal data collected by the fluorescence spectrometer and the high-speed data collector are uploaded in real time to the industrial computer 23 for processing and storage, and display the processing results in real time on the display.

The beneficial effects of the present invention are as follows: the present invention emits the lasers with the plurality of wavelengths into the atmosphere simultaneously to alternately excite the organic matter in the atmospheric particulate matters and obtain the fluorescence spectrum. The lasers with different wavelengths can excite the same organic matter to obtain different spectra. By analyzing the matrix diagram of each excitation and emission fluorescence spectrum, the present invention effectively explores the features of compositions and concentration of the organic matter in the atmospheric particulate matters. The present invention can realize continuous observation, does not need manual sampling, improves data reliability, accuracy and instantaneity, provide a basis for meteorological and environmental protection departments to grasp changes of the organic matter in the atmospheric particulate matters in time, so as to conveniently find abnormal changes in time and take effective measures to deal with the abnormal changes. Simultaneous detection of a plurality of instruments can grasp circulation of the organic matter of the atmospheric particulate matters to provide the possibility of early warning.

1. Multi-Wavelength Laser Assembly; 2. High-Energy Beam Splitter; 3. High-Energy Integrated Optical Mirror; 4. First High-Energy Reflector; 5. Second High-Energy Reflector; 6. High Energy Mirror; 7. High-Energy-Efficiency Frequency Target Assembly; 8, Cassegrain High-Power Astronomical Telescope; 9, Diaphragm; 10, First Convex Lens; 11, Second Convex Lens; 12, First Dichroic Mirror; 13, Second Dichroic Mirror; 14, Trap Wave Filter; 15, Polarizing Crystal; 16, Avalanche Diode; 17, First Photoelectric Multiplier Tube; 18, Second Photoelectric Multiplier Tube; 19, Fluorescence Frequency Conversion Frequency Divider; 20, High-Precision Synchronous Timer; 21, Fluorescence Spectrometer; 22. High-Speed Data Collector; 23. Industrial Computer; 24. Display.

DETAILED DESCRIPTION OF THE INVENTION

In order to deepen the understanding of the present invention, the present invention will be described in further detail below in conjunction with embodiments. The present embodiments are only used to explain the present invention and do not constitute a limitation on the protection scope of the present invention.

Figure 1:
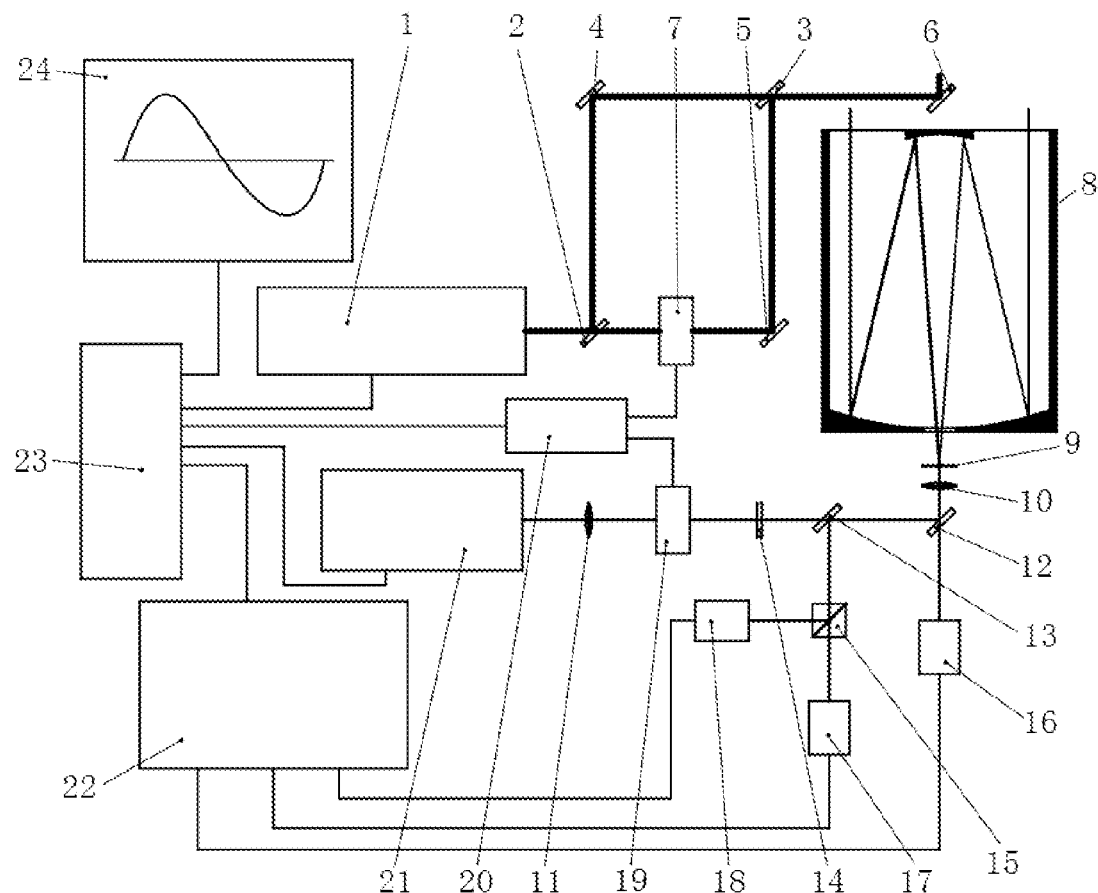
FIG. 1 is a framework diagram of the present invention.
Figure 2:
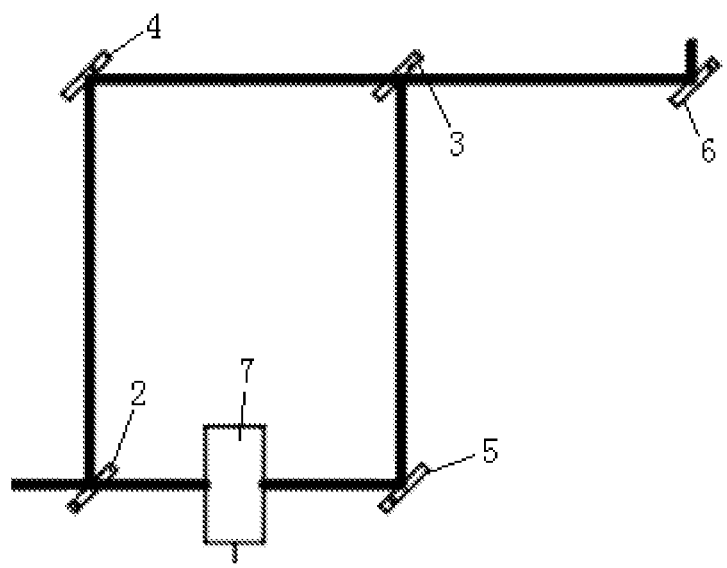
FIG. 2 is a connection diagram of a reflection direction between mirrors of the present invention.

As shown in FIGS. 1 and 2, this embodiment provides a multi-excitation wavelength spectrometer fluorescence laser radar system, characterized by comprising a multi-wavelength laser emission system, a signal frequency division system, and a data storage and display system. The multi-wavelength laser emission system consists of a multi-wavelength laser assembly 1, a high-energy beam splitter 2, a high-energy integrated optical mirror 3, a first high-energy reflector 4, a second high-energy reflector 5, a high-energy mirror 6 and a High-energy-efficiency frequency target assembly 7. The signal frequency division system consists of a Cassegrain high-power astronomical telescope 8, a diaphragm 9, a first convex lens 10, a second convex lens 11, a first dichroic mirror 12, a second dichroic mirror 13, a trap wave filter 14, a polarizing crystal 15, an avalanche diode 16, a first photoelectric multiplier tube 17, a second photoelectric multiplier tube 18, a fluorescent frequency conversion frequency divider 19 and a high-precision synchronous timer 20. The data storage and display system consists of a fluorescence spectrometer 21, a high-speed data collector 22, an industrial computer 23 and a display 24. The multi-wavelength laser assembly 1 simultaneously generates output of lasers with seven wavelengths of 266 nm, 280 nm, 295 nm, 308 nm, 355 nm, 532 nm, and 1064 nm, and divides the lasers into a first laser and a second laser through the high-energy beam splitter. The laser emitting seven wavelengths covers ultraviolet to near-infrared, with a wide range of covering.

The first laser consists of the lasers with two wavelengths of 532 nm and 1064 nm, is emitted into the atmosphere through the first high-energy reflector 4, and the high-energy light integrated optical mirror 3 and the high-energy mirror 6, and generates a mie scattering signal after irradiating dust particles, aerosols, sands and dusts, and clouds in the atmosphere. The second laser consists of the lasers with five wavelengths of 266 nm, 280 nm, 295 nm, 308 nm and 355 nm. After the lasers with five wavelengths pass through the high-energy beam splitter 2, the high-efficiency frequency target assembly 7 selects the laser with a specific wavelength. Then the laser with the specific wavelength is emitted into the atmosphere after passing through the second high-energy reflector 5, the high-energy integrated optical mirror 3 and the high-energy mirror 6. The organic matter irradiated to the atmospheric particulate matters generates the mie scattering signal, and the organic matter is excited to generate a fluorescence spectrum signal. The organic matter in the atmospheric particulate matters is excited by the lasers with the five wavelengths of 266 nm, 280 nm, 295 nm, 308 nm and 355 nm alternately. The detected fluorescence spectrum ranges from 270 nm to 700 nm. A spectrum range covers almost 85% of the fluorescence spectrum with a wide range of the fluorescence spectrum.

All the mie scattering signals and fluorescence spectrum signals generated by the first laser and the second laser irradiated into the atmosphere are received by the Cassegrain high-power astronomical telescope 8 and focus on the diaphragm 9, and the focused signals are converted into parallel light by passing through the first convex lens 10 and the parallel light is then transmitted to the first dichroic mirror 12.

The first dichroic mirror 12 separates out the laser with the long-wavelength signal of 1064 nm. The laser with the long-wavelength signal of 1064 nm is converted into electrical signals after being received by the avalanche diode 16. The electrical signals are transmitted to the high-speed data collector 22, and the remaining optical signals are transmitted to the second dichroic mirror 13 through the first dichroic mirror 12.

The second dichroic mirror 13 separates out the signals with the wavelength of 532 nm. The signals with the wavelength of 532 nm are transmitted to the first photoelectric multiplier tube 17 and the second photoelectric multiplier tube 18 via the polarizing crystal. The first photoelectric multiplier tube 17 and the second photoelectric multiplier tube 18 convert the optical signals into the electrical signals. The electrical signals are transmitted to the high-speed data collector 22, and the remaining optical signals passes through the second dichroic mirror 13 to be filtered with the signals with the wavelength of 532 nm via the trap wave filter 14 and be then continuous to be transmitted to the fluorescence frequency divider 19. The trap wave filter 14 filters the signals with the wavelength of 532 nm to make the obtained fluorescence spectrum signals more accurate.

The fluorescence frequency divider 19 is controlled by a high-precision synchronous timer 20 and synchronized with the high-energy-efficiency frequency target assembly 7, so that the fluorescence spectrum signals corresponding to the high efficiency frequency target assembly 7 are screened out, and then focused by the second convex lens 11 and projected on the fluorescence spectrometer 21, greatly improving the reliability of detecting spectrum signals.

The signal data collected by the fluorescence spectrometer 21 and the high-speed data collector 22 are uploaded in real time to the industrial computer 23 for processing and storage, and display the processing results in real time on the display 24. The fluorescence spectrometer 21 directly receives the collected fluorescence spectrum signals, which greatly improves the accuracy of the fluorescence spectrum data detected by the multi-excitation wavelength spectrometer fluorescence laser radar.

Simultaneous, continuous and uninterrupted detection can be realized. The compositions and concentration of the atmospheric particulate matters and the organic matters in the atmospheric particulate matters are recorded in real time, the collected results are timely output so that the user can accurately grasp the changes of the atmospheric particulate matters and the organic matter in time to make judgments, and take effective measures in time to deal with the changes, greatly improving reliability and practicality.

The multi-excitation wavelength spectrometer fluorescence laser radar system simultaneously emits the lasers with a plurality of wavelengths into the atmosphere, alternately excites the organic matter in the atmospheric particulate matters to obtain the fluorescence spectrum. The lasers with the different wavelengths can excite the same organic matter to obtain different spectra. By analyzing a matrix diagram of each excitation and emission fluorescence spectrum, the present invention effectively explores the features of compositions and concentration of the organic matter in the atmospheric particulate matters. The present invention can realize continuous observation, does not need manual sampling, improves data reliability, accuracy and instantaneity, provide a basis for meteorological and environmental protection departments to grasp changes of the organic matter in the atmospheric particulate matters in time, so as to conveniently find abnormal changes in time and take effective measures to deal with the abnormal changes. Simultaneous detection of a plurality of instruments can grasp circulation of the organic matter of the atmospheric particulate matters to provide the possibility of early warning.

The basic principles, main characteristics and advantages of the present invention are shown and described above. A person of ordinary skill in the art should understand that the present invention is not limited by the foregoing embodiments. The foregoing embodiments and descriptions only illustrate the principles of the present invention. Without departing from the spirit and scope of the present invention, the present invention has various changes and improvements, these changes and improvements all fall within the scope of the claimed invention. The scope of protection claimed by the present invention is defined by the appended claims and the equivalents thereof.

The invention claimed is:

1. A multi-excitation wavelength spectrometer fluorescence laser radar system, comprising: a multi-wavelength laser emission system, a signal frequency division system, and a data storage and display system,
wherein the multi-wavelength laser emission system consists of a multi-wavelength laser assembly (1), a high-energy beam splitter (2), a high-energy integrated optical mirror (3), a first high-energy reflector (4), a second high-energy reflector (5), a high-energy mirror (6) and a high-energy-efficiency frequency target assembly (7),
wherein the signal frequency division system consists of a Cassegrain high-power astronomical telescope (8), a diaphragm (9), a first convex lens (10), a second convex lens (11), a first dichroic mirror (12), a second dichroic mirror (13), a trap wave filter (14), a polarizing crystal (15), an avalanche diode (16), a first photoelectric multiplier tube (17), a second photoelectric multiplier tube (18), a fluorescent frequency conversion frequency divider (19) and a high-precision synchronous timer (20),
wherein the data storage and display system consists of a fluorescence spectrometer (21), a high-speed data collector (22), an industrial computer (23) and a display (24),
wherein the multi-wavelength laser assembly (1) is configured to simultaneously generate output of lasers with seven wavelengths of 266 nm, 280 nm, 295 nm, 308 nm, 355 nm, 532 nm, and 1064 nm, and the high-energy beam splitter (2) is configured to divide the lasers into a first laser and a second laser; the first laser consists of the lasers with two wavelengths of 532 nm and 1064 nm, and the second laser consists of the lasers with five wavelengths of 266 nm, 280 nm, 295 nm, 308 nm and 355 nm, wherein the first laser is configured to be emitted into the atmosphere through the first high-energy reflector (4), the high-energy integrated optical mirror (3) and the high-energy mirror (6), and generate a mie scattering signal after irradiating dust particles, aerosols, sands and dusts, and clouds in the atmosphere, wherein the high-energy-efficiency frequency target assembly (7) is configured to, after the lasers with the five wavelengths pass through the high-energy beam splitter (2), select the laser with a specific wavelength from the lasers with the five wavelengths of 266 nm, 280 nm, 295 nm, 308 nm and 355 nm in an alternating manner; the laser with the specific wavelength is configured to be emitted into the atmosphere after passing through the second high-energy reflector (5), the high-energy integrated optical mirror (3) and the high-energy mirror (6), and generate a mie scattering signal after irradiating an organic matter in atmospheric particulate matters; and thereby the organic matter is alternately excited by the lasers with the five wavelengths of 266 nm, 280 nm, 295 nm, 308 nm and 355 nm to generate fluorescence spectrum signals.

2. The multi-excitation wavelength spectrometer fluorescence laser radar system according to claim 1, wherein the mie scattering signals and the fluorescence spectrum signals generated by the first laser and the second laser irradiated into the atmosphere are received by the Cassegrain high-power astronomical telescope (8) and focus on the diaphragm (9), and the focused signals are converted into parallel light by passing through the first convex lens (10) and the parallel light is then transmitted to the first dichroic mirror (12).

3. The multi-excitation wavelength spectrometer fluorescence laser radar system according to claim 1, wherein the first dichroic mirror (12) is configured to separate out the laser with the long-wavelength signal of 1064 nm, the laser with the long-wavelength signal of 1064 nm is converted into electrical signals after being received by the avalanche diode (16), the electrical signals are transmitted to the high-speed data collector (22), and the remaining optical signals are transmitted to the second dichroic mirror (13) through the first dichroic mirror (12).

4. The multi-excitation wavelength spectrometer fluorescence laser radar system according to claim 1, wherein the second dichroic mirror (13) is configured to separate out the signals with the wavelength of 532 nm, the signals with the wavelength of 532 nm are transmitted to the first photoelectric multiplier tube (17) and the second photoelectric multiplier tube (18) via the polarizing crystal, the first photoelectric multiplier tube (17) and the second photoelectric multiplier tube (18) convert optical signals into electrical signals, the electrical signals are transmitted to the high-speed data collector (22), and the remaining optical signals passes through the second dichroic mirror (13) to be filtered with the signals with the wavelength of 532 nm via the trap wave filter (14) and be then continuous to be transmitted to the fluorescence frequency divider (19).

5. The multi-excitation wavelength spectrometer fluorescence laser radar system according to claim 1, wherein the fluorescence frequency conversion frequency divider (19) is controlled by the high-precision synchronous timer (20) and synchronized with the high-energy-efficiency frequency target assembly (7), the fluorescence spectrum signals corresponding to the high-efficiency-frequency target assembly (7) are screened out, then focused by the second convex lens (11) and projected on the fluorescence spectrometer (21).

6. The multi-excitation wavelength spectrometer fluorescence laser radar system according to claim 1, wherein signal data collected by the fluorescence spectrometer (21) and the high-speed data collector (22) are uploaded in real time to the industrial computer (23) for processing and storage, and processing results are displayed in real time on the display (24).

7. The multi-excitation wavelength spectrometer fluorescence laser radar system according to claim 1, wherein the diaphragm (9), the first convex lens (10), the first dichroic mirror (12), and the avalanche diode (16) are sequentially arranged in that order on a first signal path from the Cassegrain high-power astronomical telescope (8) to the high-speed data collector (22);

wherein the diaphragm (9), the first convex lens (10), the first dichroic mirror (12), the second dichroic mirror (13), the polarizing crystal (15) and the first photoelectric multiplier tube (17) are sequentially arranged in that order on a second signal path from the Cassegrain high-power astronomical telescope (8) to the high-speed data collector (22);

wherein the diaphragm (9), the first convex lens (10), the first dichroic mirror (12), the second dichroic mirror (13), the polarizing crystal (15) and the second photoelectric multiplier tube (18) are sequentially arranged in that order on a third signal path from the Cassegrain high-power astronomical telescope (8) to the high-speed data collector (22);

wherein the diaphragm (9), the first convex lens (10), the first dichroic mirror (12), the second dichroic mirror (13), the trap wave filter (14), the fluorescent frequency conversion frequency divider (19), and the second convex lens (11) are sequentially arranged in that order on a fourth signal path from the Cassegrain high-power astronomical telescope (8) to the fluorescence spectrometer (21);

wherein the high-precision synchronous timer (20) is configured to control the fluorescence frequency conversion frequency divider (19) to be synchronized with the high-energy-efficiency frequency target assembly (7) and is connected to the industrial computer (23); and wherein the fluorescence spectrometer (21), the high-speed data collector (22) and the display (24) are connected to the industrial computer (23).

8. A multi-excitation wavelength spectrometer fluorescence laser radar system, comprising: a multi-wavelength laser emission system, a signal frequency division system, and a data storage and display system;

wherein the multi-wavelength laser emission system comprises a multi-wavelength laser assembly, a beam splitter, an integrated optical mirror, a first reflector, a second reflector, an mirror, and a frequency target assembly; the multi-wavelength laser assembly is configured to simultaneously generate lasers with wavelengths of 266 nm, 280 nm, 295 nm, 308 nm, 355 nm, 532 nm, and 1064 nm, and the beam splitter is configured to divide the lasers with wavelengths of 266 nm, 280 nm, 295 nm, 308 nm, 355 nm, 532 nm, and 1064 nm into a first laser and a second laser; the first laser comprises the lasers with wavelengths of 532 nm and 1064 nm, and the second laser comprises the lasers with wavelengths of 266 nm, 280 nm, 295 nm, 308 nm and 355 nm; the first laser is configured to be irradiated into the atmosphere through the first reflector, the integrated optical mirror and the mirror, and thereby generate mie scattering signals; the frequency target assembly is configured to, after the lasers with the wavelengths of 266 nm, 280 nm, 295 nm, 308 nm and 355 nm pass through the beam splitter (2), select the laser with a specific wavelength from the lasers with the wavelengths of 266 nm, 280 nm, 295 nm, 308 nm and 355 nm in an alternating manner; the laser with the specific wavelength is configured to be irradiated into the atmosphere after passing through the second reflector, the integrated optical mirror and the mirror, and generate a mie scattering signal after irradiating an organic matter in atmospheric particulate matters; and thereby the organic matter is alternately excited by the lasers with the wavelengths of 266 nm, 280 nm, 295 nm, 308 nm and 355 nm to generate fluorescence spectrum signals;

wherein the data storage and display system comprises a fluorescence spectrometer, a data collector, an industrial computer, and a display; and the fluorescence spectrometer, the data collector, and the display are connected to the industrial computer individually;

wherein the signal frequency division system comprises a Cassegrain astronomical telescope, a diaphragm, a first convex lens, a second convex lens, a first dichroic mirror, a second dichroic mirror, a trap wave filter, a polarizing crystal, an avalanche diode, a first photoelectric multiplier tube, a second photoelectric multiplier tube, a fluorescent frequency conversion frequency divider and a synchronous timer arranged in a designated manner to form a plurality of signal paths each with a signal transmission direction from the Cassegrain astronomical telescope to a corresponding one of the fluorescence spectrometer and the data collector; the Cassegrain astronomical telescope is configured to receive and focus the mie scattering signals and the fluorescence spectrum signals generated by the first laser and the second laser irradiated into the atmosphere; one of the plurality of signal paths with the signal transmission direction from the Cassegrain astronomical telescope to the fluorescence spectrometer has the diaphragm, the first convex lens, the first dichroic mirror, the second dichroic mirror, the trap wave filter, the fluorescent frequency conversion frequency divider, and the second convex lens sequentially arranged thereon in that order; the synchronous timer is connected to the industrial computer and configured to control the fluorescence frequency conversion frequency divider to be synchronized with the frequency target assembly.

9. The multi-excitation wavelength spectrometer fluorescence laser radar system according to claim 8, wherein the other of the plurality of signal paths comprises a first signal path, a second signal path, and a third signal path each with the signal transmission direction from the Cassegrain astronomical telescope to the data collector; the first signal path has the diaphragm, the first convex lens, the first dichroic mirror, and the avalanche diode sequentially arranged thereon in that order; the second signal path has the diaphragm, the first convex lens, the first dichroic mirror, the second dichroic mirror, the polarizing crystal, and the first photoelectric multiplier tube sequentially arranged thereon in that order; and the third signal path has the diaphragm, the first convex lens, the first dichroic mirror, the second dichroic mirror, the polarizing crystal, and the second photoelectric multiplier tube sequentially arranged thereon in that order.

* * * * *